//  US009763557B2

United States Patent
Kim et al.

(10) Patent No.: US 9,763,557 B2
(45) Date of Patent: Sep. 19, 2017

(54) DISH RACK AND DISHWASHER USING THE SAME

(71) Applicant: LG ELECTRONICS INC., Seoul (KR)

(72) Inventors: Minchul Kim, Seoul (KR); Kitae Kwon, Seoul (KR); Myungwon Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/274,017

(22) Filed: Sep. 23, 2016

(65) Prior Publication Data

US 2017/0086646 A1    Mar. 30, 2017

(30) Foreign Application Priority Data

| Sep. 24, 2015 | (KR) | 10-2015-0135493 |
| Sep. 25, 2015 | (KR) | 10-2015-0136396 |
| Jan. 5, 2016 | (KR) | 10-2016-0001166 |

(51) Int. Cl.
   *A47L 15/50* (2006.01)

(52) U.S. Cl.
   CPC .......... *A47L 15/507* (2013.01); *A47L 15/504* (2013.01)

(58) Field of Classification Search
   CPC ...... A47L 15/50; A47L 15/504; A47L 15/506; A47L 15/507
   USPC .............................. 312/228.1, 311; 211/41.8
   See application file for complete search history.

(56) References Cited

U.S. PATENT DOCUMENTS

| 3,809,450 | A | * | 5/1974 | Guth | A47L 15/504 |
| | | | | | 312/351 |
| 3,822,085 | A | * | 7/1974 | Clark | A47B 88/407 |
| | | | | | 312/311 |
| 5,595,200 | A | * | 1/1997 | Favaro | A47L 15/504 |
| | | | | | 134/201 |
| 5,657,878 | A | | 8/1997 | Austin | |
| 5,860,716 | A | * | 1/1999 | Good | A47L 15/504 |
| | | | | | 312/311 |

(Continued)

FOREIGN PATENT DOCUMENTS

| DE | 19512128 | 10/1996 |
| EP | 0033483 | 8/1981 |
| GB | 2359248 | 8/2001 |

OTHER PUBLICATIONS

Extended European Search Report issued in European Application No. 16189823.4 on Oct. 24, 2016, 7 pages.

*Primary Examiner* — James O Hansen
(74) *Attorney, Agent, or Firm* — Fish & Richardson P.C.

(57) ABSTRACT

Disclosed are a dish rack and dishwasher having the same. The present invention includes a wash tub forming a wash space, a rack configured to store a dish by being drawably provided within the wash tub, and a plurality of spray units configured to spray water upon the rack, wherein the rack comprises a frame configured to store a dish, a moving roller unit coupled with the frame to move upward and downward, the moving roller unit supporting a guide rail to draw the frame, and a location adjusting unit coupled with the frame, the location adjusting unit configured to selectively fix an upward/downward movement of the moving roller unit and release a fixed state of the moving roller unit to enable the upward/downward movement of the moving roller unit.

18 Claims, 12 Drawing Sheets

(56) References Cited

U.S. PATENT DOCUMENTS

| | | | |
|---|---|---|---|
| 6,247,771 B1* | 6/2001 | Miller | A47L 15/506 312/272 |
| 7,651,180 B2* | 1/2010 | Deiss | A47L 15/504 312/311 |
| 2005/0039782 A1* | 2/2005 | Kim | A47L 15/504 134/58 D |
| 2005/0133469 A1* | 6/2005 | Mersch | A47L 15/504 211/41.8 |
| 2006/0119236 A1 | 6/2006 | Dickson et al. | |
| 2008/0011337 A1 | 1/2008 | Ryu et al. | |
| 2015/0002005 A1* | 1/2015 | Park | A47L 15/506 312/228.1 |

* cited by examiner

DISH RACK AND DISHWASHER USING THE SAME

Pursuant to 35 U.S.C. §119(a), this application claims the benefit of earlier filing date and right of priority to Korean Application No. 10-2015-0135493, filed on Sep. 24, 2015, No. 10-2015-0136396, filed on Sep. 25, 2015 and No. 10-2016-0001166, filed on Jan. 5, 2016, the contents of which are hereby incorporated by reference herein in their entirety.

BACKGROUND OF THE INVENTION

Field of the Invention

The present invention relates to a dishwasher, and more particularly, a dish rack and dishwasher having the same. Although the present invention is suitable for a wide scope of applications, it is particularly suitable for the dish rack to be drawable from and storable in the dishwasher, enable the stored dishes to be arranged more easily, and prevent safety accident in case of being withdrawn.

Discussion of the Related Art

Generally, a dishwasher is a device for cleaning dishes by spraying water on the stored dishes at high pressure and then drying the cleaned dishes. In particular, the dishwasher works in a manner as follows. First of all, water at high pressure is sprayed into a tub having a dish stored therein. As the sprayed water touches the dish, particles (e.g., food leftovers, etc.) attached to a surface of the dish can be removed to clean the dish.

Such a dishwasher is configured to reuse the used water in a manner of filtering out food leftovers contained in the water and is also configured to separate food leftovers smoothly by supplying detergent mixed with the water. Recently, a dishwasher equipped with a function of raising a temperature of water by a heater and/or a function of raising cleaning efficiency by generating steam is popularly used.

A dishwasher of the related art consists of a case forming an exterior, a wash tub provided within the case to configure a wash space of a dish, a door located in front of the wash tub to open/close the wash tub, a drive unit provided under the wash tub to supply, collect, circulate and drain water for washing a dish, lower, upper and top spray units configured to spray water supplied by the drive unit upon the dish, and lower, upper and top racks provided between the lower, upper and top spray units inside the wash tub to be selectively loadable according to a type and/side of the dish.

In this case, a multitude of moving rollers are provided under each of the racks. And, each of the racks is provided drawable and storable in a manner of being guided by a separate guide rail provided within the wash tub.

Meanwhile, the lower rack is located adjacent to the lower spray unit. A dish in a relatively large size is seated on the lower rack. The upper rack is located adjacent to the upper spray unit. A dish in a relatively small size is seated on the upper rack. The top rack is located adjacent to the top spray unit. Eating tools (e.g., spoon, knife, etc.) in size smaller than that of a dish and cooking tools (e.g., ladle, whisk, etc.) are seated on the top rack.

Meanwhile, in order to wash a dish and the like using the dishwasher, a user opens the door of the dishwasher, draws out one of the racks in the wash tub, puts a dish on the drawn rack, pushes the drawn rack into the wash tub of the dishwasher, and then closes the door to store the dish.

Thereafter, if the dishwasher is actuated, the water is individually or simultaneously supplied to the lower, upper and top spray units according to an operation of the drive unit so that the washing of the dishes loaded into the lower, upper and top racks can proceed. Additionally, after the dish has been washed and rinsed with the water, it is heated with steam to be dried and sterilized.

Meanwhile, according to the related art, the lower, upper and top racks are configured to be drawn along guide rails by being seated on the guide rails, respectively. Hence, each of the guide rails is fixed to a sidewall within the wash tub, and a vertical position of each of the racks moving along the guide rails is in a fixed state as well.

In case of the racks of the related art, if a dish is larger than a space between the lower, upper and top racks, since a space margin of the lower/upper/top rack is insufficient, it is impossible to store the corresponding dish in the corresponding rack. In order to store a dish larger than the space between the lower, upper and top racks, one of the lower, upper and top racks is separated and the corresponding dish can be stored in the rack below the separated rack. Hence, the corresponding space may cause inconvenience for the space utilization of the rack.

Meanwhile, the rack of the related art is formed of a material having a metal frame coated with a synthetic resin. A handle for drawing the rack is provided to both sides of the rack. And, a user can draw the corresponding rack by holding the handle of the rack.

As mentioned in the foregoing description, for the drying and sterilization of a dish, it is necessary to heat the dish using such a heating means as a steam or the like. As a rack having the dish seated thereon is heated together with the heated dish. Hence, when a user draws the rack by holding a handle of the rack, since a user's skin comes into contact with the heated rack, such a contact give the user an unpleasant feeling and may cause a problem of a safety accident.

SUMMARY OF THE INVENTION

Accordingly, the present invention is directed to a dish rack and dishwasher having the same that substantially obviate one or more problems due to limitations and disadvantages of the related art.

One object of the present invention is to provide a dish rack and dishwasher having the same, by which in loading a dish into the dishwasher for cleaning, a dish stored space can be varied according to a size of the dish.

Another object of the present invention is to provide a dish rack and dishwasher, by which user's safety accident can be prevented from drawing a dish rack in a manner of avoiding a direct contact between a user currently drawing the dish rack and a heated rack in the course of drawing the dish rack.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a rack according to one embodiment of the present invention may include a frame configured to store a dish, a moving roller unit coupled with the frame to move upward and downward, the moving roller unit supporting a guide rail to draw the frame, and a location adjusting unit coupled with the frame, the location adjusting unit configured to selectively fix an upward/downward movement of the moving roller unit and release a fixed state of the moving roller unit to enable the upward/downward movement of the moving roller unit.

Preferably, the frame may include an outer frame in a horizontal chain shape, a vertical frame arranged in a drawing direction of the frame, and a horizontal frame arranged to cross with the vertical frame by being connected to the outer frame and the vertical frame.

More preferably, the rack may further include a frame cover configured to cover a top side of the outer frame in a manner of being coupled with the top side of the outer frame.

Herein, the moving roller unit and the location adjusting unit may be provided in a symmetric configuration to each of both sides of a drawing direction of the frame.

The frame cover may be configured to extend between the location adjusting unit provided to both sides of the frame.

More preferably, a top side of location adjusting unit may be configured to form a portion of a top side of the frame and extend for a top side of the frame cover.

Preferably, the moving roller unit may include an upper roller supporting an upper part of the guide rail and a lower roller supporting a lower part of the guide rail.

Preferably, the moving roller unit may include a multitude of latch sills and the location adjusting unit may include a rotation lever configured to rotate by receiving a pressure in a direction crossing with a moving direction of the frame and a rotation latch part configured to release a locked state of the latch sill by receiving a rotation force of the rotation lever.

More preferably, the location adjusting unit may include a housing fixed to the frame, the rotation lever may include a button projection exposed from the housing externally by being rotatably coupled with the housing and a rotation portion configured to be rotated by a pressure applied to the button projection, and the rotation latch part may include an interworking portion configured to interwork with the rotation portion by being rotatably coupled with the housing and a latch projection configured to be supported by the latch sill by extending from the interworking portion.

Herein, the rotation latch part may further include a spring configured to pressurize the latch projection toward the latch sill.

More preferably, the location adjusting unit may include a housing configured to form an outer portion of the outer frame and have a handle formed in a prescribed inner portion and the horizontal frame and the vertical frame may extend near the housing.

More preferably, the location adjusting unit may include a housing configured to be fixed to the outer frame and have a handle formed in a prescribed inner portion, the handle may include a handle space portion perforating the housing, and the horizontal frame and the vertical frame may extend near the handle space portion.

Preferably, a top side of the location adjusting unit may form a portion of a top side of the frame.

Preferably, the moving roller unit may include a multitude of latch sills and the location adjusting unit may include a latch part configured to move in a direction in parallel with a drawing direction of the frame and be selectively caught on a multitude of the latch sills to move a location of the latch part and a display part configured to indicate the location of the latch part.

More preferably, the location adjusting unit may include a housing fixed to the frame and the latch part may include a knob exposed through the housing and a latch projection configured to be selectively caught on the latch sill in response to a movement of the knob.

Herein, the latch adjusting unit may further include a spring configured to pressurize the latch projection toward the latch sill.

More preferably, the display part may be formed on a top side of the housing near the knob.

In another aspect of the present invention, as embodied and broadly described herein, a dishwasher according to one embodiment of the present invention may include a wash tub forming a wash space, a rack configured to store a dish by being drawably provided within the wash tub, and a plurality of spray units configured to spray water upon the rack, wherein the rack may include a frame configured to store a dish, a moving roller unit coupled with the frame to move upward and downward, the moving roller unit supporting a guide rail to draw the frame, and a location adjusting unit coupled with the frame, the location adjusting unit configured to selectively fix an upward/downward movement of the moving roller unit and release a fixed state of the moving roller unit to enable the upward/downward movement of the moving roller unit.

Preferably, the moving roller unit may include a multitude of latch sills and the location adjusting unit may include a rotation lever configured to rotate by receiving a pressure in a direction crossing with a moving direction of the frame and a rotation latch part configured to release a locked state of the latch sill by receiving a rotation force of the rotation lever.

Preferably, the moving roller unit may include a multitude of latch sills and the location adjusting unit may include a latch part configured to move in a direction in parallel with a drawing direction of the frame and be selectively caught on a multitude of the latch sills to move a location of the latch part and a display part configured to indicate the location of the latch part.

Accordingly, the present invention provides the following effects and/or features.

First of all, the present invention provides a height-adjustable dish rack and dishwasher, by which in loading a dish into the dishwasher for cleaning, a height of a dish stored rack can be adjusted according to a size of the dish.

Secondly, regarding a dish rack and dishwasher using the same, user's safety accident can be prevented from drawing the dish rack in a manner of avoiding a direct contact between a user currently drawing the dish rack and a heated rack in the course of drawing the dish rack.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to a rack and dishwasher using the same according to one embodiment of the present invention, examples of which are illustrated in the accompanying drawings.

First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's intention in best way.

First of all, a dishwasher according to one embodiment of the present invention shall be described in detail with reference to the accompanying drawings.

Figure 1:
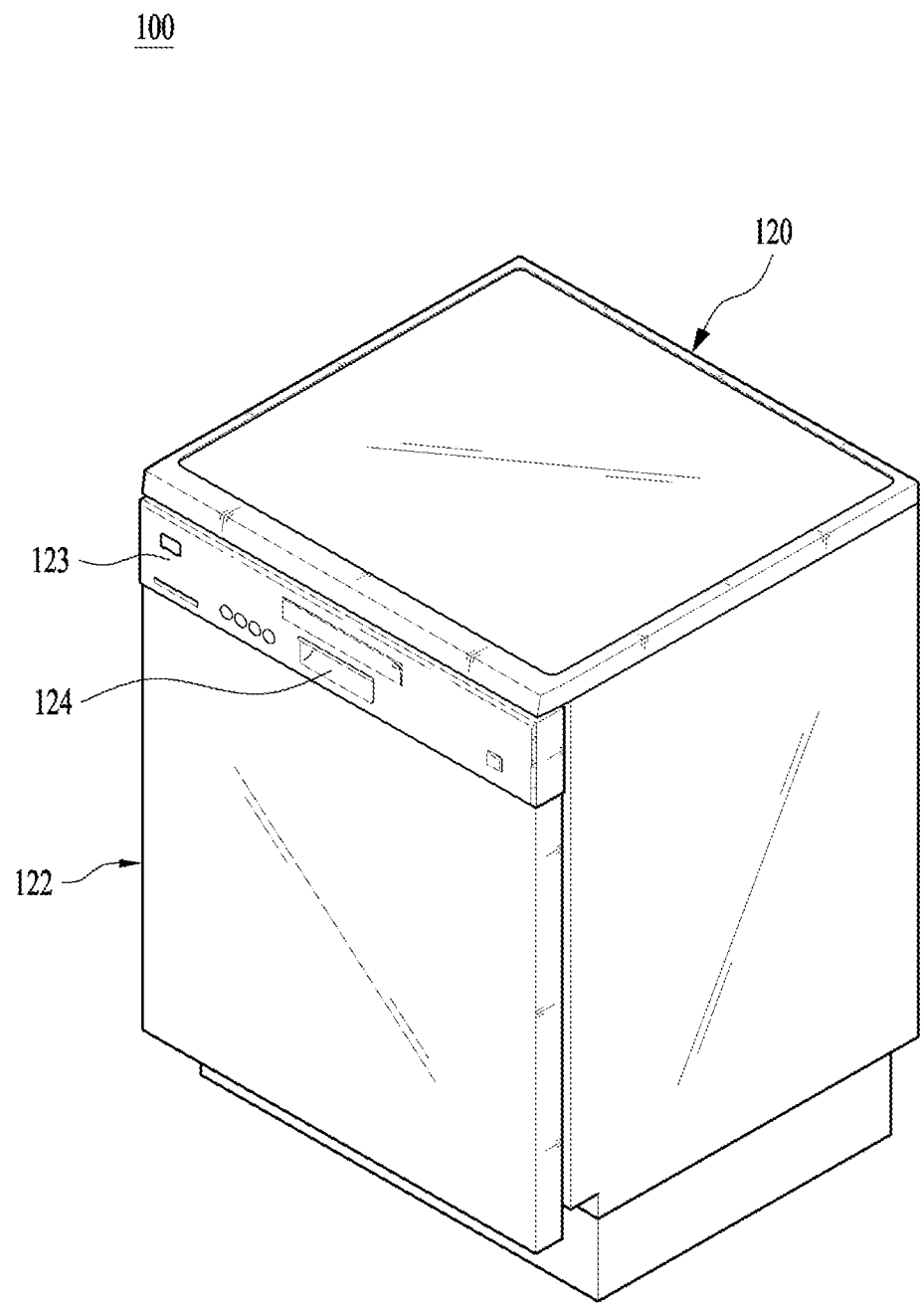
FIG. 1 is a perspective diagram of a dishwasher according to the present invention.
Figure 2:
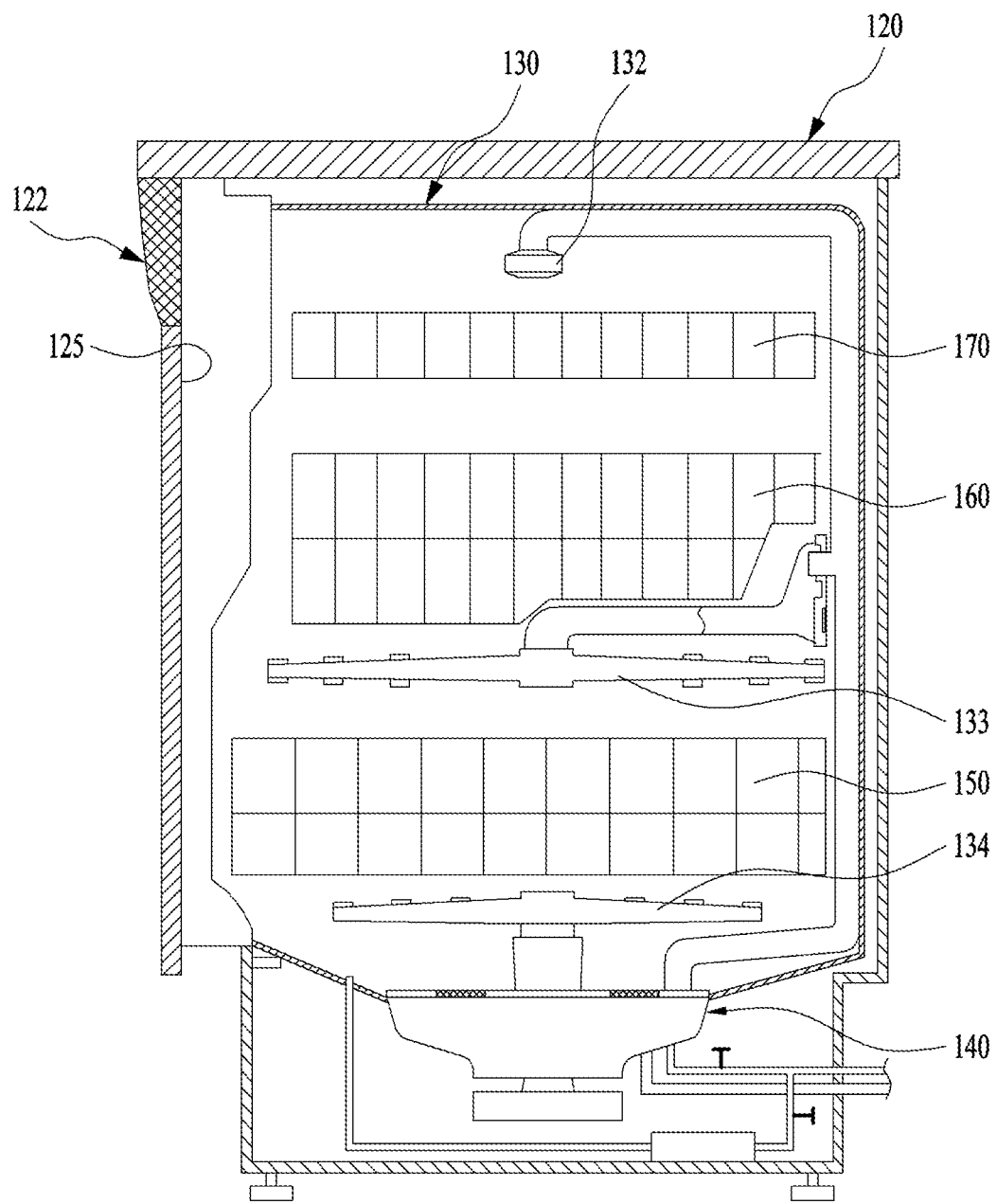
FIG. 2 is a schematic diagram of an internal configuration of a dishwasher according to the present invention.

FIG. 1 is a perspective diagram of a dishwasher according to the present invention, and FIG. 2 is a schematic diagram of an internal configuration of the dishwasher according to the present invention.

Referring to FIG. 1 and FIG. 2, a dishwasher 100 according to the present invention may include a case 120 forming an exterior, a wash tub 130 provided within the case 120 to configure a wash space for washing a dish therein by having an open front side, a door 122 configured to open/close the open side of the wash tub 130, a drive unit 140 provided under the wash tub 130 to supply, collect, circulate and drain water for washing a dish, a multitude of racks 150, 160 and 170 detachably provided within the wash tub 130 to have dishes seated thereon, a multitude of spray units 132, 133 and 134 installed adjacent to the racks 150, 160 and 170 to spray the water for washing the dishes, respectively, and a steam supply unit (not shown) configured to heat the dishes to dry and sterilize the washed dishes seated on the racks.

Herein, the wash tub 130, the drive unit 140 and each of the spray units in the configuration of the dishwasher 100 may be identical to the former configuration of the related art or can be embodied by the configuration similar to that of the related art. Hence, details shall be omitted.

Meanwhile, a multitude of the racks 150, 160 and 170 are configured to be drawable toward the open side of the wash tub 130 from an inside of the wash tub 130. Such racks may include a first rack 150 located on a lower part of the wash tub 130 to store a relatively large dish, a second rack 160 located over the first rack 150 to store a relatively small dish, and a third rack 170 located on an upper part of the wash tub 130 to store dishes and the like.

A multitude of the spray units 132, 133 and 134 are configured to spray water upon the dishes and the like stored in the racks 150, 160 and 170, respectively. The spray units 132, 133 and 134 may include a lower spray unit 134 located on a lower part of the wash tub 130 to spray the water upon the first rack 150, an upper spray unit 133 located between the first rack 150 and the second rack 160 to spray the water upon the first and second racks 150 and 160, and a top spray unit 132 located over the wash tub 130 to spray the water upon the third rack 170 or the second rack 160.

Meanwhile, a guide rail 220 for guiding the first third racks 150, 160 and 170 to be drawn or inserted is provided to both sidewalls of the wash tub 130. And, the guide rail 220 may include a fixed guide rail (not shown) of a simple rail type to guide the drawing-out or insertion of the first rack 150 and flexible guide rails (not shown) configured to guide the drawing-out and storage of the second and third racks 160 and 170 in a manner of increasing drawing distances in response to the drawing-out of the second and third racks 160 and 170, respectively.

Meanwhile, the door 122 is configured to open/close the open side formed on a front side of the wash tub 130. The door 122 is provided with a hinge part (not shown) normally provided under the open side to open/close the door 122. Hence, the door 122 is opened using the hinge part as a rotation shaft.

Herein, a handle 124 for opening the door 122 and a control panel 123 for controlling the dishwasher 100 are provided to an outer surface of the door 122. An inner surface of the door 122 configures one side of the wash tub 130 in case of closing the door 122 or a seat surface to have the first rack 150 seated thereon in case of opening the door 122. To this end, in case of opening the door 122, the seat surface preferably configures a state of a flat surface extending to the guide rail for guiding the first rack 150.

Meanwhile, the present invention relates to the second rack 160 in which dishes in relatively various sizes can be stored. In particular, regarding the second rack 160, as a space between the second rack 160 and the third rack 170 varies in response to the variation of a vertical location, a storable space of the second rack 160 becomes variable. Furthermore, regarding the second rack 160, as a space between the second rack 160 and the first rack 150 varies in response to the variation of a vertical location, a storable space of the first rack 150 becomes variable. Meanwhile, the technical configuration of the present invention can be implemented by selectively applying to the first to third racks 150, 160 and 170.

Therefore, the present invention shall be described by taking the second rack 160 as one example. And, such a technical configuration of the present invention can be implemented by applying to other dish storable racks unless limiting the technical configuration of the present invention.

The second rack 160 according to one embodiment of the present invention is described in detail with reference to the accompanying drawings as follows.

Figure 3:
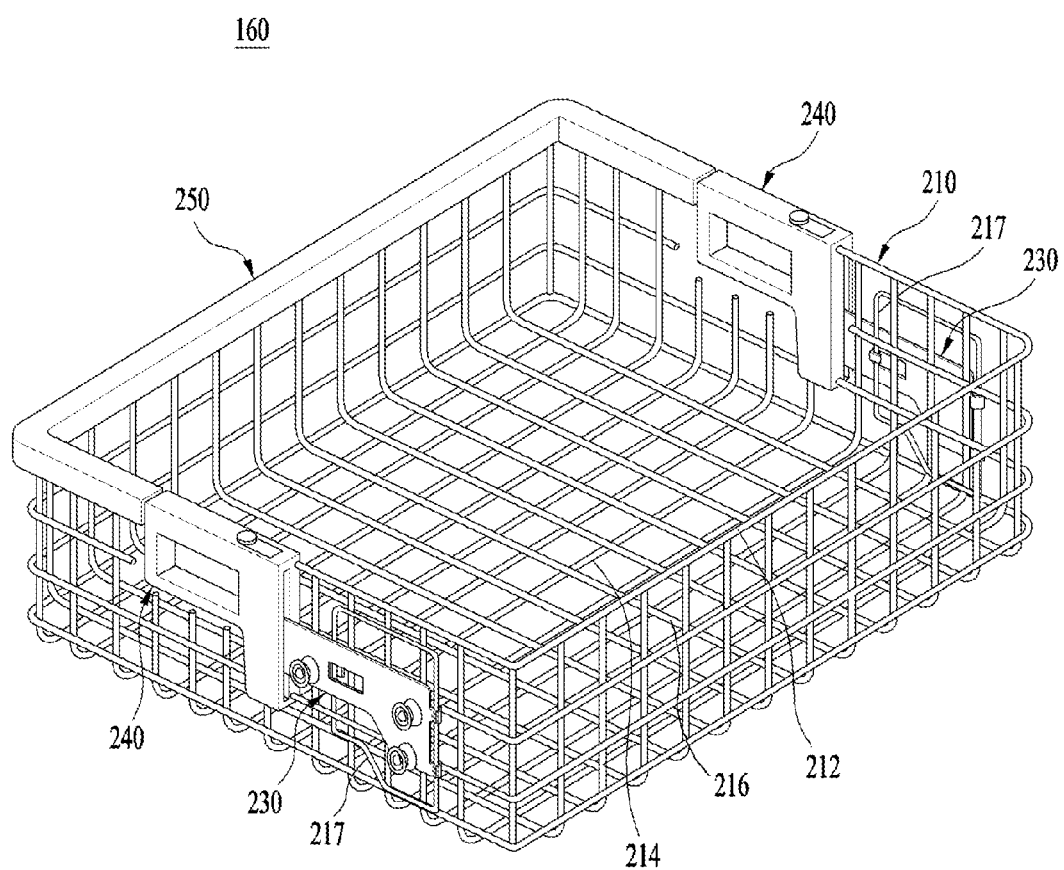
FIG. 3 is a perspective diagram of a rack in a dishwasher according to one embodiment of the present invention.
Figure 4:
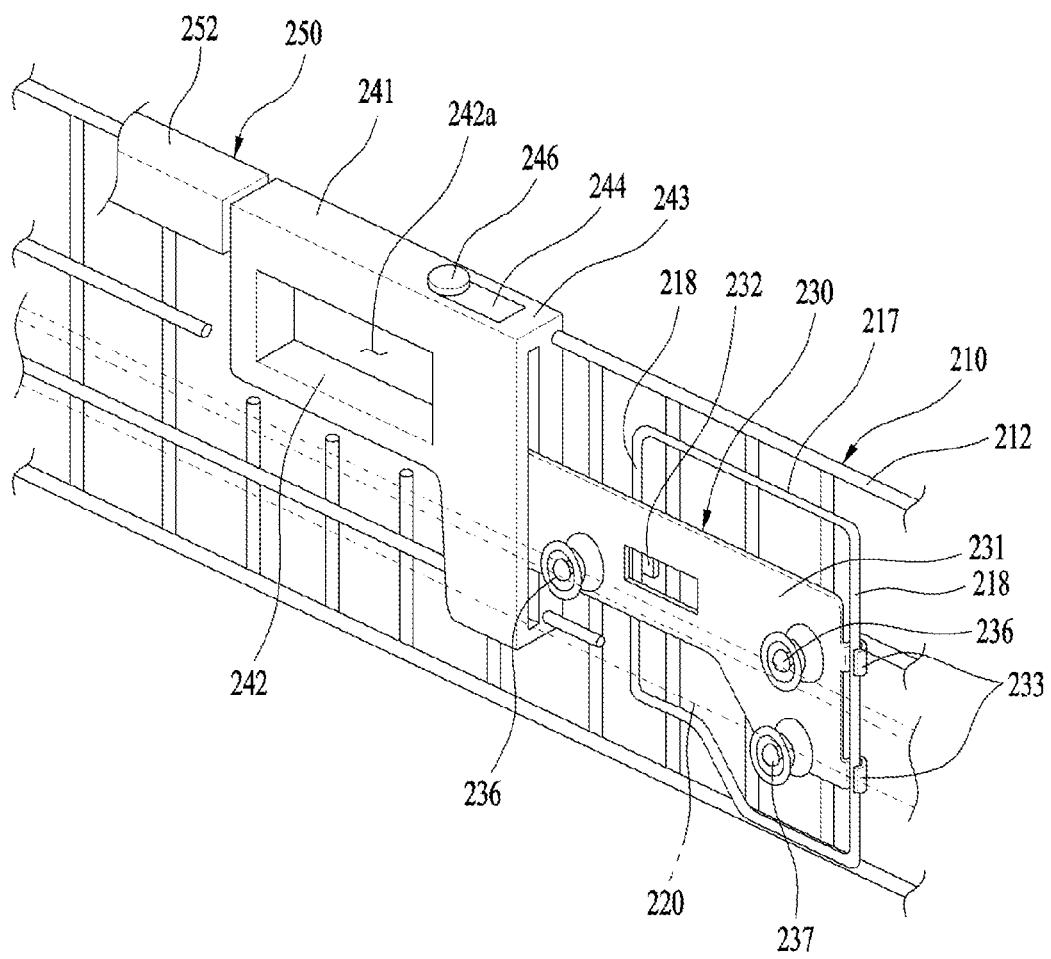
FIG. 4 is a perspective diagram of a height adjusting unit of a rack in a dishwasher according to one embodiment of the present invention.
Figure 5:
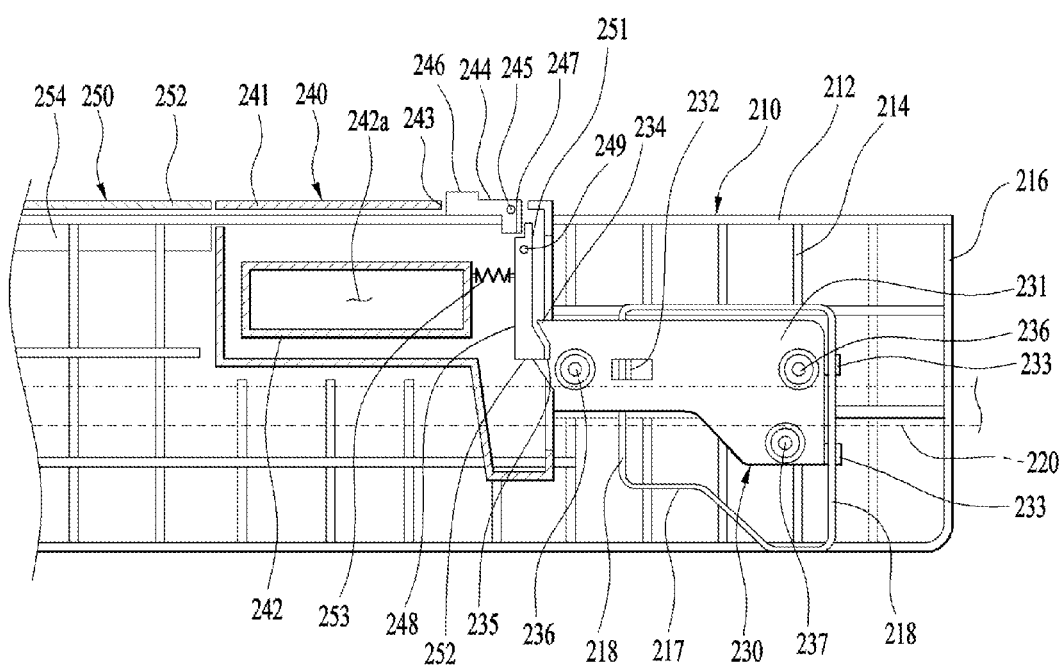
FIG. 5 is a lateral cross-sectional diagram of a height adjusting unit of a rack in a dishwasher according to one embodiment of the present invention.

FIG. 3 is a perspective diagram of a rack in a dishwasher according to one embodiment of the present invention, FIG. 4 is a perspective diagram of a height adjusting unit of a rack in a dishwasher according to one embodiment of the present invention, and FIG. 5 is a lateral cross-sectional diagram of a height adjusting unit of a rack in a dishwasher according to one embodiment of the present invention.

Referring to FIGS. 3 to 5, a first rack 150 of the dishwasher 100 according to the present invention may include a frame 210 forming a space for storing dishes, a multitude of guides (not shown) provided within the frame 210 to support a dish in a fixed state, a moving roller unit 230 provided to both sides of the frame 210 in a drawing direction to be seated on a guide rail 220, a location adjusting unit 240 provided to the frame 210 to adjust a vertical location of the moving roller unit 230, and a frame cover 250 provided over the frame 210 to cover.

Herein, the frame 210 may be configured in a grill shape. The frame 210 may be configured in a manner that metal wires cross with each other to form a grid pattern. And, surfaces of the wires can be coated with synthetic resin to prevent corrosion of the wires.

In particular, as the frame 210 is configured in the grill shape, the water sprayed from the lower spray unit 134 or the upper spray unit 133 can be effectively delivered to the dishes stored in the first rack 150.

Meanwhile, the frame 210 may include an outer frame 212, a horizontal frame 214 and a vertical frame 216. The outer frame 212 can be configured in a horizontal chain shape having at least one frames connected contiguously.

In this case, the vertical frame 216 can be connected to the outer frame 212 by being arranged in a drawing direction of the first rack 150. The horizontal frame 214 is arranged in a manner of crossing with the vertical frame 216 in a vertical direction and can be connected to the outer frame 212 and the vertical frame 216.

And, a guide frame 217 may be further provided to guide the moving roller unit 230 to move in a direction orthogonal to the guide rail by being provided to the outer frame 212 configuring the frame 210. Such a guide frame 217 is formed of the same material of the frame 210 configuring the second rack 160 and includes a pair of vertical parts 218 configured to extend in a vertical direction to enable a plate 231 to move in the vertical direction.

At least one of the outer frame 212, the horizontal frame 214 and the vertical frame 216 can be omitted or may be omitted in part. The material and shape of the frame 210 are non-limited by the above description.

In particular, among a multitude of the vertical frames 216 and a multitude of the horizontal frames 214, some of the vertical and horizontal frames 216 and 214 adjacent to the location adjusting unit 240 may be configured not to be directly connected to the location adjusting unit 240.

Specifically, if the vertical frame 215 or the horizontal frame 214 extends toward an inside of a handle 242 of the location adjusting unit 240, when a user holds the handle 242 of the location adjusting unit 240, the user touches the frame 210 seated on washing or drying a dish so as to feel discomfort. Preferably, the vertical frame 216 and the horizontal frame 214 are provided not to extend toward an inside of the handle 242 formed in the location adjusting unit 240.

Meanwhile, as mentioned in the foregoing description, any frame capable of storing a dish of the present invention may correspond to the frame 210 of the present invention despite failing to have the same configuration of the frame 210 configured with the outer frame 212, the horizontal frame 214 and the vertical frame 216.

Herein, the frame cover 250 is detachably provided over the outer frame 212 configuring the frame 210 along the outer frame 212 across one front or whole side of the frame 210. The frame cover 250 is provided to prevent the user from coming into direct contact with the frame 210 by covering the outer frame 212 configuring the frame 210 and the horizontal and vertical frames 216 connected to the outer frame 212 in part. Herein, the frame cover 250 is preferably configured to cover a top of the front side of the outer frame 212 by extending between the location adjusting units 240 provided to both right and left sides of the frame 210.

The frame cover 250 includes a body part 252 provided to a bottom side in a shape corresponding to that of the outer frame 21 so as to have the outer frame 212 formed therein and an insertion slot 254 provided to a bottom side of the body part 252 by extending to enable a top side of the outer frame 212 to be inserted therein. And, a pair of fixing projections (not shown) may be formed on both inner sides of the insertion slot 254 so as to fix the outer frame 212 that is inserted.

When the rack 160 is used, the frame cover 250 is mounted on the top side of the frame 210. When a dish is washed and dried, if the frame 210 is heated, the frame cover 250 shields the top side of the frame 210. In doing so, when a user holds the handle of the location adjusting unit 240, the frame cover 250 prevents the user from coming into contact with the frame 210 of the rack 160. Therefore, the frame cover 250 can prevent user's discomfort due to the temperature difference between the outer frame 212 and the user.

A moving roller unit 230 is located on each of both sides of the frame in a drawing direction of the frame 210. Preferably, the moving roller unit 230 is located on a most outer side of the outer frame 212 configuring the frame 210.

A pair of moving roller units 230 are formed on both sides of the frame 210 in a symmetric direction. Hereinafter, one of the moving roller units 230 is described only but the other shall not be described.

The moving roller unit 230 includes a plate 231 movably coupled with the vertical part 218 of the guide frame 217, an upper roller 236 provided to an upper part of the plate 231 to support a top side of the guide rail 220, and a lower roller 237 provided to a lower part of the plate 231 to support a bottom side of the guide rail 220.

Herein, a front guide 232 and a rear guide 233 movably coupled with a pair of the vertical parts 218 provided to the guide frame 217 are provided to a front side and a rear side of the plate 231, respectively. And, first and second latch sills 234 and 235 are provided to a front end portion of the plate 231 so as to be caught on the location adjusting unit 240.

Herein, the first and second latch sills 234 and 235 are formed on a front side of the plate 231 in a step shape. In the present invention, the first latch sill 234 may be located at a center portion of the plate 231 and the second latch sill 235 may be formed on an upper part of the plate 231. If necessary, an additional latch sill may be further provided to the plate 231 as well as the first and second latch sills 234 and 235.

Meanwhile, regarding the second rack 160, when a pair of the moving roller units 230 are seated on the guide rails 220 provided to both inner sides of the wash tub 130, respectively, the second rack 160 descends in a bottom direction owing to the weight of the second rack 160 including the frame 210. Hence, as the moving roller unit 230 is supported by the corresponding guide rail 220, it maintains a state of moving in an upper direction of the guide frame 217 by being supported by the guide rail 220.

The location adjusting unit 240 is provided to restrict the vertical movement of the moving roller unit 230, and may include a housing 241 configured to have the first and second latch sills 234 and 235 of the moving roller unit 230 inserted therein and be fixed to the outer frame 212 located in front of the moving roller unit 230, a rotation latch part 248 provided to an inside of the housing 241 to be caught on the first and second latch sills 234 and 235 of the plate 231 to restrict ascendance of the moving roller unit 230, and a rotation lever 244 projected outside the housing 241 to release a locked state by rotating the rotation latch part 248 with an external force.

Herein, the housing 241 is provided with the handle 242 to be held by a user to draw the second rack 160, move the second rack 160, and adjust height of the second rack 160. And, a button portion 243 is formed on a top side of the housing 241 to expose the rotation lever 244 therethrough.

The housing 241 of the location adjusting unit 240 is installed to be fixed to a prescribed portion of the outer frame 212. And, a handle space portion 242a is formed in an inside of the handle 242 formed in the housing 241 of the location adjusting unit 240 so as to have the handle held by a user.

Herein, the outer frame 212, the horizontal frame 214 and the vertical frame 216, which configure the frame 210, are formed not to extend inside the handle space portion 242a of the handle 242 formed in the housing 241 of the location adjusting unit 240.

In particular, the outer frame 212, the horizontal frame 214 and the vertical frame 216 are formed not to extend inside the handle space portion 242a of the handle 242 formed in the housing 241 of the location adjusting unit 240. When a user holds the handle 242, the outer frame 212, the horizontal frame 214 and the vertical frame 216 are formed to prevent user's hand from coming into contact with the outer frame 212, the horizontal frame 214 and the vertical frame 216.

Meanwhile, at least one of the horizontal frame 241 and the vertical frame 216 may be connected to a bottom part of the housing 241 to reinforce the fixation of the housing 241.

A first rotation shaft 245 is provided below one side of the button portion 243 formed in the housing 241 so as to have the rotation lever 244 coupled rotatably. And, a second rotation shaft 249 is provided under the first rotation shaft 245 so as to have the rotation latch part 248 coupled rotatably.

Meanwhile, regarding the rotation lever 244, a center portion of the rotation lever 244 is rotatably coupled with the first rotation shaft 245. A button projection 246 is formed on one side of the rotation lever 244 in a manner of being projected outside the button portion 243. And, a rotation portion 247 is formed to extend on the other side of the rotation lever 244 to be adjacent to the rotation latch part 248 so as to rotatably move the rotation latch part 248 by being rotated in case of pressurizing the button projection 246.

Herein, the rotation portion 247 extends in parallel with a direction of the pressure applied to the button projection 246. As the rotation portion 247 is rotated, it rotates the rotation latch part 248 by delivering the pressure in a direction orthogonal to the direction of the pressure applied to the button projection 246.

The rotation latch part 248 is rotatably coupled with the second rotation shaft 249. A top end of the rotation latch part 248 is provided with an interworking portion 251 adjacent to the rotation portion 247 of the rotation lever 244 so as to be rotated in response to a rotation of the rotation lever 244. And, a latch projection 252 is projected from a bottom end of the rotation latch part 248 so as to be caught on the first and second latch sills 234 and 235 formed on the plate 231 of the moving roller unit 230. And, the latch projection 252 interworks in response to the rotation of the interworking portion 251.

And, the rotation latch part 248 is provided with a spring 253 configured to apply a prescribed elastic force toward the first and second latch sills 234 and 235 formed in the plate 231 of the moving roller unit 230 so as maintain a state that the latch projection 252 of the rotation latch part 248 is fixed to the first latch sill 234 or the second latch sill 235.

Operations of a height-adjustable rack and dishwasher using the same according to embodiments of the present invention are described in detail with reference to the accompanying drawings as follows. The respective components mentioned in the following description can be understood by referring to the former descriptions and drawings.

First of all, in order to wash a dish and the like using the dishwasher 100, a user opens the door 122 of the dishwasher 100, draws at least one of the first to third racks 150, 160 and 170 within the wash tub 130, loads the dish into the drawn rack, pushes the dish loaded rack into the wash tub 130 of the dishwasher 100, and then closes the door 122 to store the dish therein.

Thereafter, if the dishwasher 100 is activated, the water is supplied to the upper spray unit 133, the lower spray unit 134 and the top spray unit 132 in response to the operation of the drive unit 140 individually or simultaneously so that the dish loaded into each of the racks is washed, rinsed and dried. Since the case of washing, rinsing and drying dishes, which is mentioned in the above, is very similar to the operation of the general dishwasher 100, details shall be omitted.

In doing so, the dishes should be stored in the respective racks 150, 160 and 170 prior to the actuation of the dishwasher 100 mentioned in the above. And, a specific one of the racks should be drawn for the dish storage.

First of all, in case of the second rack 160 or the third rack 170, as the corresponding rack is guided by the flexible guide rail provided to each of both inner sides of the wash tub 130, a drawing distance is adjusted. And, the dishes are loaded while the corresponding rack is supported by the flexible guide rail.

The first rack 150 is moved in a manner of being guided by the fixed guide rail provided to a lower part of each of both inner sides of the wash tub 130. When the first rack 150 is drawn, it is seated on the seat surface of the door 122 that is open. While the first rack 150 is seated on seat surface 125 of the door 122, the dish can be loaded.

Meanwhile, dishes in relatively various sizes can be stored in the second rack 160. Moreover, by varying the vertical location of the second rack 160 for the size of the dish stored in the second rack 160, an upper storage space of the second rack 160 can be extended. Hence, dishes in various sizes can be stored therein.

The moving roller unit 230 and the location adjusting unit 140 are provided to each of both sides of the frame 210 of the second rack 160 so as to form a symmetric configuration. Hence, operations of the moving roller unit 230 and the locating adjusting unit 240 on one side are described but the operations of the moving roller unit 230 and the locating adjusting unit 240 on the other side shall be omitted.

First of all, one use state of the second rack 160 is described with reference to FIG. 5 as follows. The one use state of the second rack corresponds to a user state of the second rack for the case of loading a relatively small dish into the second rack or the case of loading a relatively large dish into the first rack.

As shown in the drawing, in one use state of the second rack 160, the latch projection 252 of the rotation latch part 248 provided to the location adjusting unit 240 is caught on the first latch sill 234 formed on the plate 231 of the moving roller unit 230.

Herein, regarding the rotation latch part 248 of the location adjusting unit 240, the latch projection 252 of the rotation latch part 248 is elastically supported toward the first latch sill 234, while the latch projection 252 of the rotation latch part 252 maintains the state supported by the first latch sill 234.

Hence, the location adjusting unit 240 provided with the rotation latch part 248 and the frame 210 coupled with the location adjusting unit 240 are supported by the first latch sill 234 of the plate 231 of the moving roller unit 230 seated on the guide rail 220, they maintain a prescribed height for the guide rail 220 and the moving roller unit 230.

Figure 6:
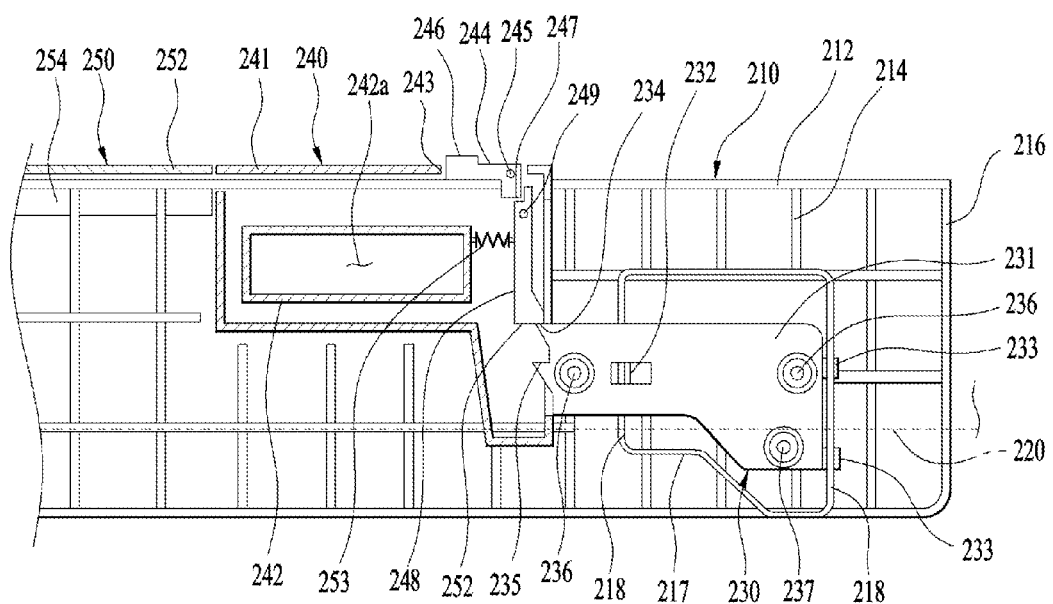
FIG. 6 is a use state diagram to illustrate an operating state of a rack in a dishwasher according to one embodiment of the present invention.

Meanwhile, another use state for storing a relatively large dish in the second rack 160 is described with reference to FIG. 6 as follows. Another use state of the second rack 160 corresponds to a state that the second rack 160 descends toward the first rack 150.

As shown in the drawing, in order to extend a space between the second rack 160 and the third rack 170, a user should descend the second rack 160 toward the first rack 150. To this end, the user holds the handle 242 of the location adjusting unit 240 and pressurizes the button projection 246 provided to the rotation lever 244 of the location adjusting unit 240. In doing so, the direction for pressurizing the button projection 246 of the rotation lever 244 corresponds to a direction opposite to that of a force applied by the user to the handle of the location adjusting unit 240.

Meanwhile, the pressure applied to the button projection 246 of the rotation lever 244 rotates the rotation lever 244 with reference to the first rotation shaft 245. And, the rotation portion 247 of the rotated rotation lever 244 pressurizes the interworking portion 251 of the rotation latch part 248 so as to rotate the rotation latch part 248.

Herein, as the rotation latch part 248 is rotated, the latch projection 22 of the rotation latch part 248 is detached from the first latch sill 234 of the plate 231 of the moving roller unit 230 so that the location adjusting unit 240 can descend against the moving roller unit 230.

Thereafter, the user lowers the location adjusting unit 240 and the frame 210 coupled with the location adjusting unit 240 in a direction of the first rack 150 and then releases the pressure applied to the button projection 246 of the location adjusting unit 240.

Hence, the rotation latch part 248, from which the pressure applied toward the spring 253 of the location adjusting unit 240 has been released, is caught on the second latch sill 235 as the latch projection 252 of the rotation latch part 248 is moved toward the plate 231 by the elastic force of the spring 253.

Therefore, since a space for storing the dish in the second rack 160 can be secured in a manner of moving the second rack 160 toward the first rack 150, it is able to store a larger dish in the second rack 160.

Meanwhile, in drawing the second rack 160 and adjusting the height of the second rack 160, when a user holds the handle 242 formed in the housing 241 of the location adjusting unit 240, it is able to prevent a direct contact with the outer frame 212 of the second rack 160 by the frame cover 250 installed on the outer frame 212.

Moreover, in drawing the second rack 160 and adjusting the height of the second rack 160, when a user holds the handle 242 formed in the housing 241 of the location adjusting unit 240, since the frame 210 such as the outer frame 212, the vertical frame 216, the horizontal frame or the like does not extend toward an inside of the handle 242 formed in the housing 241, it is able to prevent the user, who is currently holding the location adjusting unit 240, from coming into contact with each of the frames 212, 214 and 216.

Therefore, since the outer frame among the frames 212, 214 and 214 heated on washing and drying the dish is shielded by the frame cover 250 and the horizontal frame 214 and the vertical frame 216 do not extend toward the inside of the handle 242 of the location adjusting unit 240, it is able to prevent a contact between the heated frame 210 and a user.

A height adjusting unit of a rack according to another embodiment of the present invention is described in detail with reference to the accompanying drawings as follows.

Figure 7:
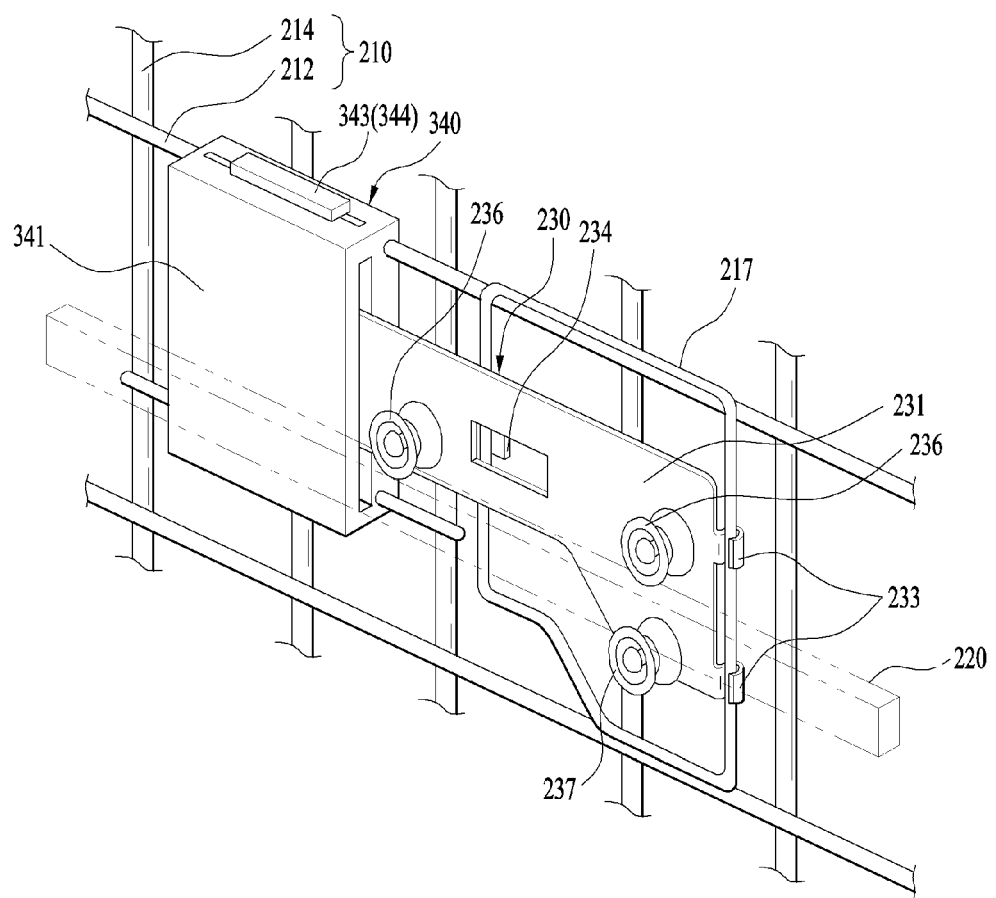
FIG. 7 is a perspective diagram of a height adjusting unit of a rack in a dishwasher according to another embodiment of the present invention.
Figure 8:
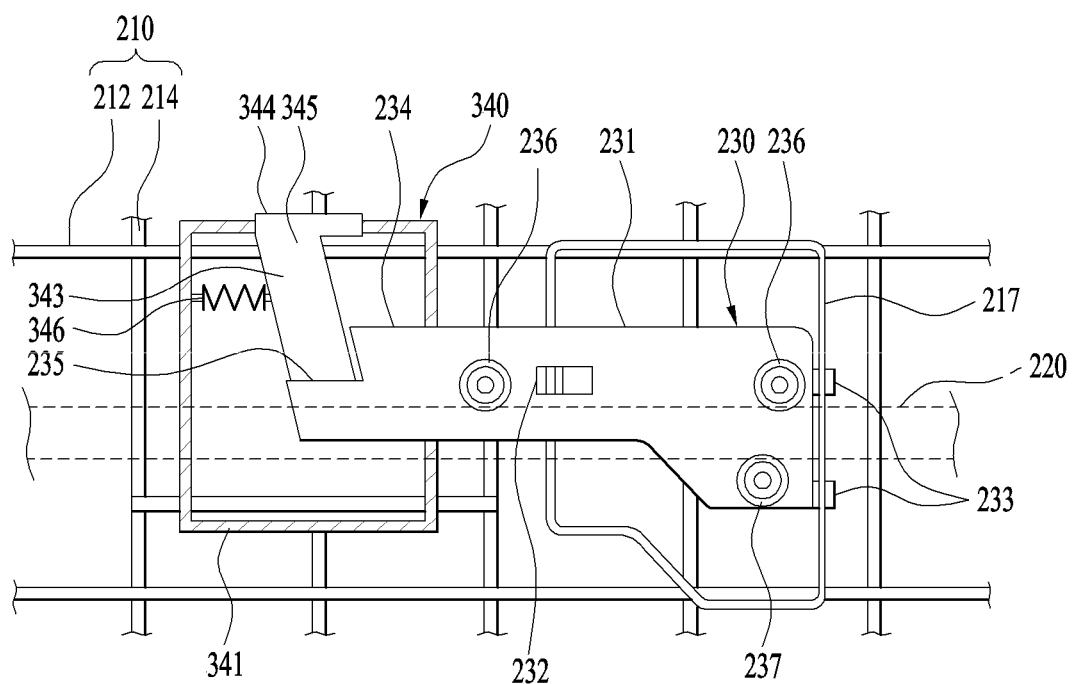
FIG. 8 is a lateral cross-sectional diagram of a height adjusting unit of a rack in a dishwasher according to another embodiment of the present invention.
Figure 9:
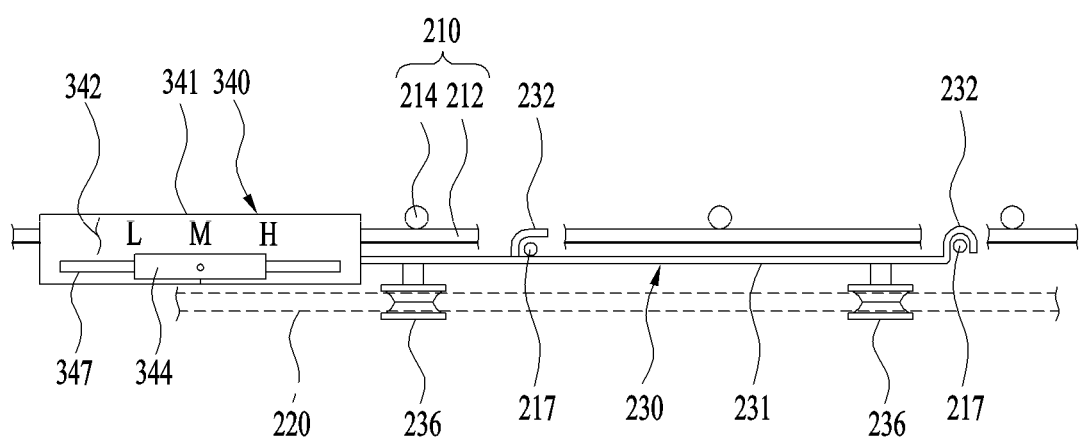
FIG. 9 is a layout of a height adjusting unit of a rack in a dishwasher according to another embodiment of the present invention.

FIG. 7 is a perspective diagram of a height adjusting unit of a rack in a dishwasher according to another embodiment of the present invention, FIG. 8 is a lateral cross-sectional diagram of a height adjusting unit of a rack in a dishwasher according to another embodiment of the present invention, and FIG. 9 is a layout of a height adjusting unit of a rack in a dishwasher according to another embodiment of the present invention.

Referring to FIGS. 7 to 9, a first rack 150 of the dishwasher 100 according to the present invention may include a frame 210 forming a space for storing dishes, a multitude of guides (not shown) provided within the frame 210 to support a dish in a fixed state, a moving roller unit 230 provided to both sides of the frame 210 in a drawing direction to be seated on a guide rail 220, and a location adjusting unit 340 provided to the frame 210 to display and adjust a vertical location of the moving roller unit 230.

Herein, the frame 210 and the moving roller unit 230 may formed to have the same configurations of the former frame 210 and the former moving roller unit 230 according to one embodiment of the present invention. Hence, details of the frame 210 and the moving roller unit 230 shall be omitted, and the respective configurations of the frame 210 and the moving roller unit 230 can be understood by referring to the former frame 210 and the former moving roller unit 230 of one embodiment of the present invention.

The location adjusting unit 340 is provided to restrict the vertical movement of the moving roller unit 230, and may include a housing 341 configured to have the first and second latch sills 234 and 235 of the moving roller unit 230 inserted therein and be fixed to the outer frame 212 located in front of the moving roller unit 230, and a latch part 343 provided within the housing 341 so as to be caught on the first and second latch sills 234 and 235 in order to restrict the ascendance of the moving roller unit 230.

Herein, a slide slot 347 is formed on a top side of the housing 341 so as to expose the latch part 343. And, a display part 342 for displaying a location of the latch part 343 exposed through the slide slot 347 is provided to one side of the slide recess 347.

Meanwhile, the display part 342 is provided to display the location of the latch part 343 caught by the moving roller unit 230 and may be displayed in a manner of corresponding to the first and second latch sills 234 and 235 provided to the plate 231 of the moving roller unit 230.

According to the embodiment of the present invention, if the latch part 343 indicated on the display part 342 fails to be caught on any one of the first and second latch sills 234 and 235, it can be displayed as 'L'. If the latch part 343 is caught on the first latch part 234, it can be displayed as 'M'. If the latch part 343 is caught on the second latch part 235, it can be displayed as 'H'.

In particular, 'L', 'M' and 'H' displayed on the display part 342 may be formed of the same material of the housing on which the display part is formed. And, it is able to check the location of the rack by checking the indication of the display part according to the movement of the latch part provided to the housing.

Meanwhile, the latch part 343 is elastically supported in a direction of the plate 231 within the housing 341 and provided to restrict the vertical location of the frame 210, which is coupled with the housing 341 by being supported by the first and second latch sills 234 and 235 formed on the plate 231, against the guide rail 220.

Such a latch part 343 may include a knob 344 provided within the housing 341 so as to be moved by a user by being projected from the slide slot 347 formed on the top side of the housing 341, a latch projection 345 extending from a bottom of the knob 344 so as to be supported by a top side of the first or second latch sill 234 or 235 in response to a movement of the knob 344, and a spring 346 provided between the housing 341 and the latch projection 345 so as to pressurize and support the latch part 343 toward the first and second latch sills 234 and 235 elastically.

In particular, the latch part 343 of the location adjusting unit 340 is in a state of being pressurized by the elastic force of the spring 346 toward the plate 231 of the moving roller unit 230. Depending on whether the latch projection 345 of the latch part 343 is caught on the first latch sill 234 or the second latch sill 235 of the plate 231 or whether the latch protection 345 is not caught on the first and second latch sills 234 and 235, a location of the knob 344 of the latch part 343 is selectively located at 'L', 'M' or 'H' formed on the display part 342 of the housing 341. Hence, a user can recognize a location of the second rack 160 by comparing the location of the knob 344 of the latch part 343 to 'L', 'M' or 'H' formed on the display part 342 of the housing 341.

In the following, operations of a height-adjustable rack and dishwasher using the same according to another embodiment of the present invention are described in detail with reference to the accompanying drawings. The respective components mentioned in the following description can be understood by referring to the former descriptions and drawings.

Figure 10:
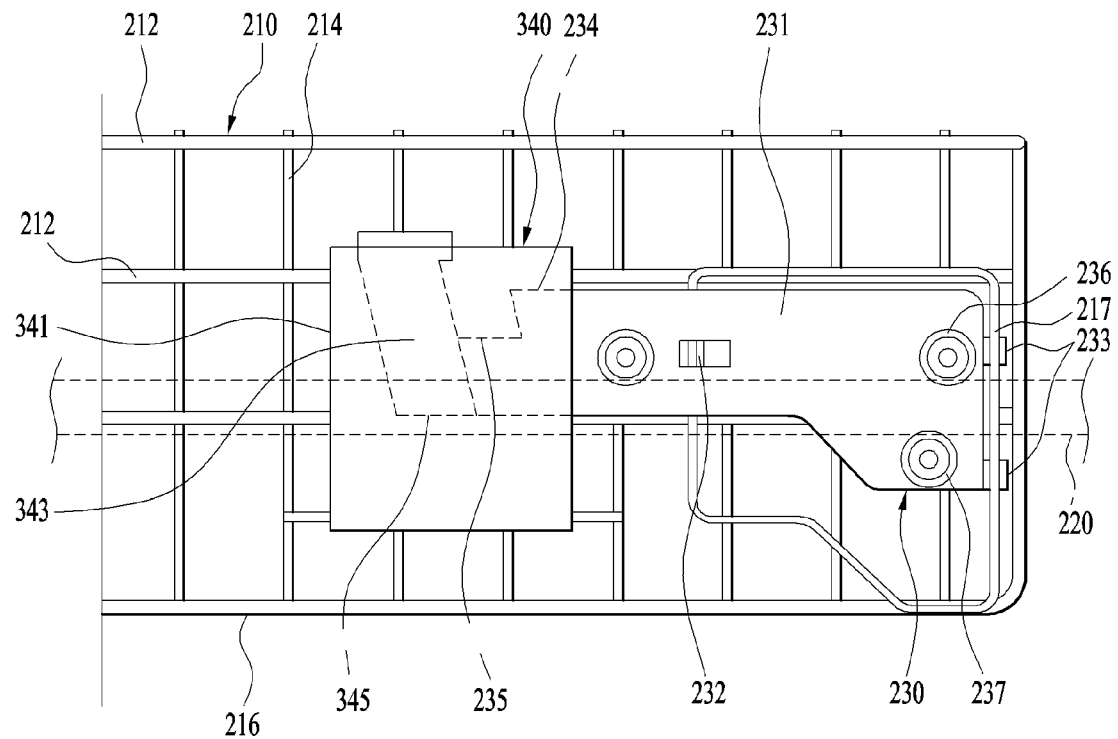
FIGS. 10 to 12 are use state diagrams to illustrate an operating state of a rack in a dishwasher according to another embodiment of the present invention.
Figure 11:
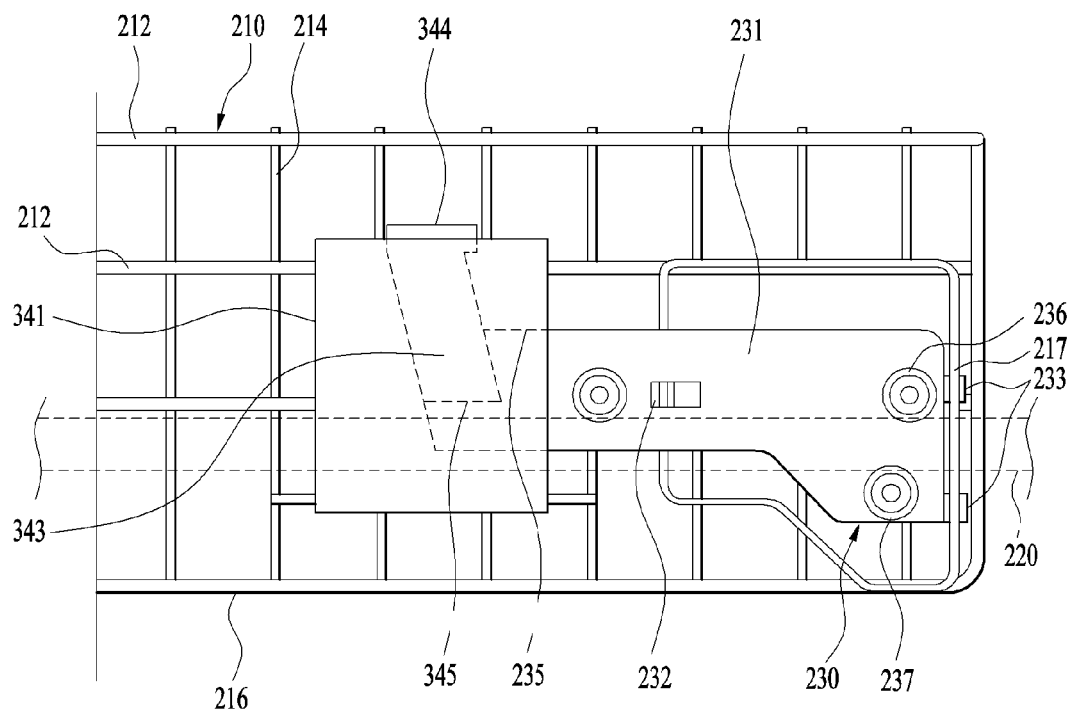
Figure 12:
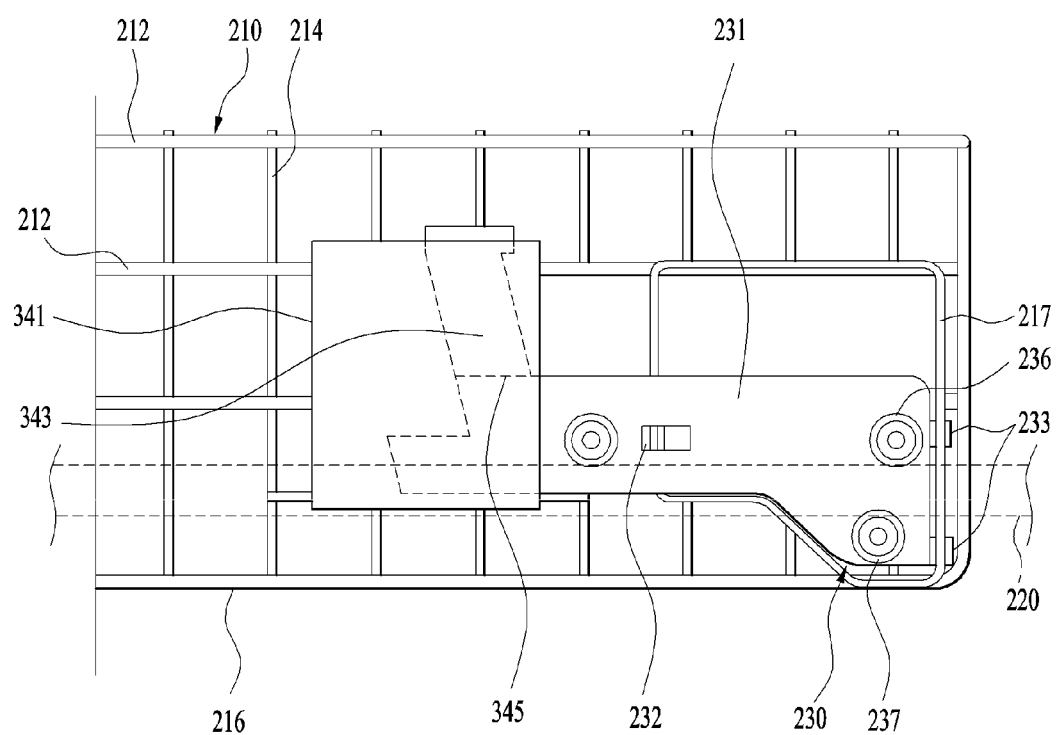

FIGS. 10 to 12 are use state diagrams to illustrate an operating state of a rack in a dishwasher according to another embodiment of the present invention.

In this case, a general operating process of a dishwasher may be the same as the operating process of the dishwasher according to one embodiment of the present invention mentioned in the foregoing description. Hence, the description of the dishwasher operating process shall be omitted and can be understood by referring to the former operating process according to one embodiment.

Meanwhile, dishes in relatively various sizes can be stored in the second rack 160 (or the first rack 150). Moreover, by varying the vertical location of the second rack 160 for the size of the dish stored in the second rack 160 (or the first rack 150), a storage space of the second rack 160 (or the first rack 150) can be extended. Hence, dishes in various sizes can be stored therein.

In particular, in order to store a relatively large dish in the first rack 150, it is able to store a dish in the first rack 150 in a manner of increasing a space between the first rack 150 and the second rack 160 by moving a location of the second rack 160 upward. In order to store a relatively large dish in the second rack 160, it is able to store a dish in the second rack 160 in a manner of increasing a space between the second rack 160 and the third rack 170 by moving a location of the second rack 160 downward.

Meanwhile, the moving roller unit 230 and the location adjusting unit 340 according to another embodiment of the present invention are provided to each of both sides of the frame 210 of the second rack 160 so as to form a symmetric configuration. Hence, operations of the moving roller unit 230 and the locating adjusting unit 340 on one side are described but the operations of the moving roller unit 230 and the locating adjusting unit 240 on the other side shall be omitted.

First of all, with reference to FIG. 10, a use state of the second rack 160 in a normal state is described. In the present invention, a normal use state of the second rack 160 means that the second rack 160 is located in the middle of the first rack 150 and the third rack 170.

A normal use state of the second rack 160 is a state that the latch projection 345 of the latch part 343 provided to the location adjusting unit 340 is caught on the first latch sill 234 formed on the plate 231 of the moving roller unit 230. In this case, the second rack 160 is located in the middle of the first rack 150 and the third rack 170 while supported by a center portion against the guide rail 220 coupled with the second rack 160.

Herein, the knob 344 of the location adjusting unit 340 is located near the indication 'M' of the display part 342 provided to the housing 341 of the location adjusting unit 340. And, a user can obtain a current state of the second rack 160 according to the location of the knob 344 of the display part 342.

With reference to FIG. 11, described in the following is a state that the second rack 160 ascends toward the third rack 170 in a normal use state in order to store a relatively large dish in the first rack 150.

Referring to FIG. 11, in order to increase a space between the first rack 150 and the second rack 160, a user needs to raise the second rack 160 toward the third rack 170. To this end, the user detaches the latch projection 345 of the latch part 343 from the first latch sill 234 of the plate 231 by holding the location adjusting unit 340 and then pressurizing the knob 344 of the location adjusting unit 340 toward the spring 346.

Thereafter, the user raises the location adjusting unit 340 and the frame 219 coupled with the location adjusting unit 340 toward the third rack 170 and then releases the pressure applied to the knob 344 of the location adjusting unit 340. Hence, the knob 344 released from the pressure applied to the knob 344 of the location adjusting unit 340 is moved toward the second latch sill 235 by the elastic force of the spring 346.

In doing so, if the user removes the force applied to the location adjusting unit 340, the second rack 160 descends owing to weight of its own. Subsequently, as the latch projection 345 of the location adjusting unit 340 is supplied by the second latch sill 235 of the plate 231, the location adjusting unit 340 and the frame 210 coupled with the location adjusting unit 340 are restricted from descending.

Herein, the knob 344 of the location adjusting unit 340 is located near the indication 'H' of the display part 342 provided to the housing 341 of the location adjusting unit 340. And, a user can obtain a current state of the second rack 160 according to the location of the knob 344 of the display part 342.

Moreover, since it is able to secure a space for storing a dish in the first rack 150 can be secured by moving the second rack 160 toward the third rack 170, it is able to store a larger dish in the first rack 150.

With reference to FIG. 12, described in the following is a state that the second rack 160 is lowered toward the first rack 150 in a normal use state in order to store a relatively large dish in the second rack 160.

Referring to FIG. 12, in order to increase a space between the second rack 160 and the third rack 170, a user needs to lower the second rack 160 toward the first rack 150. To this end, the user detaches the latch projection 345 of the latch part 343 from the first latch sill 234 of the plate 231 by holding the location adjusting unit 340 and then pressurizing the knob 344 of the location adjusting unit 340 toward the spring 346.

Thereafter, the user lowers the location adjusting unit 340 and the frame 219 coupled with the location adjusting unit 340 toward the first rack 150 and then releases the pressure applied to the knob 344 of the location adjusting unit 340. Hence, the knob 344 released from the pressure applied to the knob 344 of the location adjusting unit 340 is moved toward the plate 231 by the elastic force of the spring 346 and then stays in a state of not being caught on the first and second latch sills.

Herein, the knob 344 of the location adjusting unit 340 is located near the indication 'L' of the display part 342 provided to the housing 341 of the location adjusting unit 340. And, a user can obtain a current state of the second rack 160 according to the location of the knob 344 of the display part 342.

Moreover, since it is able to secure a space for storing a dish in the second rack 160 can be secured by moving the second rack 160 toward the first rack 150, it is able to store a larger dish in the second rack 160.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A rack comprising:
 a frame configured to store a dish;
 a moving roller unit that comprises a multitude of latch sills and that is coupled with the frame to move upward and downward, the moving roller unit supporting a guide rail to draw the frame; and
 a location adjusting unit coupled with the frame, the location adjusting unit configured to selectively fix an upward/downward movement of the moving roller unit and release a fixed state of the moving roller unit to enable the upward/downward movement of the moving roller unit,
 wherein the location adjusting unit comprises:
  a housing fixed to the frame,
  a rotation lever configured to rotate by receiving a pressure in a direction crossing with a moving direction of the frame, wherein the rotation lever comprises a button projection exposed from the housing externally by being rotatably coupled with the housing and a rotation portion configured to be rotated by a pressure applied to the button projection, and
  a rotation latch part configured to release a locked state of the latch sill by receiving a rotation force of the rotation lever, wherein the rotation latch part comprises an interworking portion configured to interwork with the rotation portion by being rotatably coupled with the housing, a latch projection configured to be supported by the latch sill by extending from the interworking portion, and a spring configured to pressurize the latch projection toward the latch sill.

2. The rack of claim 1, the frame comprising:
 an outer frame in a horizontal chain shape;
 a vertical frame arranged in a drawing direction of the frame; and
 a horizontal frame arranged to cross with the vertical frame by being connected to the outer frame and the vertical frame.

3. The rack of claim 2, further comprising a frame cover configured to cover a top side of the outer frame in a manner of being coupled with the top side of the outer frame.

4. The rack of claim 3, wherein the moving roller unit and the location adjusting unit are provided in a symmetric configuration to each of both sides of a drawing direction of the frame.

5. The rack of claim 4, wherein the frame cover is configured to extend between the location adjusting unit provided to both sides of the frame.

6. The rack of claim 3, wherein a top side of location adjusting unit is configured to form a portion of a top side of the frame and extend along a top side of the frame cover.

7. The rack of claim 2, wherein the location adjusting unit comprises a housing configured to form an outer portion of the outer frame and have a handle formed in a prescribed inner portion and wherein the horizontal frame and the vertical frame extend near the housing.

8. The rack of claim 2, wherein the location adjusting unit comprises a housing configured to be fixed to the outer frame and have a handle formed in a prescribed inner portion, wherein the handle comprises a handle space portion perforating the housing, and wherein the horizontal frame and the vertical frame extend near the handle space portion.

9. The rack of claim 1, the moving roller unit comprising:
 an upper roller supporting an upper part of the guide rail; and
 a lower roller supporting a lower part of the guide rail.

10. The rack of claim 1, wherein a top side of the location adjusting unit forms a portion of a top side of the frame.

11. A rack comprising:
 a frame configured to store a dish;
 a moving roller unit that comprises a multitude of latch sills and that is coupled with the frame to move upward and downward, the moving roller unit supporting a guide rail to draw the frame; and
 a location adjusting unit coupled with the frame, the location adjusting unit configured to selectively fix an upward/downward movement of the moving roller unit and release a fixed state of the moving roller unit to enable the upward/downward movement of the moving roller unit,
 wherein the location adjusting unit comprises:
  a housing fixed to the frame,
  a latch part configured to move in a direction in parallel with a drawing direction of the frame and be selectively caught on the multitude of latch sills to move a location of the latch part, wherein the latch part comprises a knob exposed through the housing and a latch projection configured to be selectively caught on the latch sill in response to a movement of the knob, a spring configured to pressurize the latch projection toward the latch sill, and a display part configured to indicate the location of the latch part.

12. The rack of claim 11, wherein the display part is formed on a top side of the housing near the knob.

13. The rack of claim 11, wherein the frame comprises:

an outer frame in a horizontal chain shape, a vertical frame arranged in a drawing direction of the frame, and a horizontal frame arranged to cross with the vertical frame by being connected to the outer frame and the vertical frame.

14. The rack of claim 13, further comprising:

a frame cover configured to cover a top side of the outer frame in a manner of being coupled with the top side of the outer frame.

15. The rack of claim 14, wherein the moving roller unit and the location adjusting unit are provided in a symmetric configuration to each of both sides of a drawing direction of the frame.

16. The rack of claim 15, wherein the frame cover is configured to extend between the location adjusting unit provided to both sides of the frame.

17. The rack of claim 14, wherein a top side of the location adjusting unit is configured to form a portion of a top side of the frame and extend along a top side of the frame cover.

18. The rack of claim 11, wherein the moving roller unit comprises:

an upper roller supporting an upper part of the guide rail, and a lower roller supporting a lower part of the guide rail.

* * * * *